(12) United States Patent
Polzer et al.

(10) Patent No.: US 12,535,121 B2
(45) Date of Patent: Jan. 27, 2026

(54) APPARATUS FOR STABILIZATION OF AN INSTRUMENTATION PLATFORM

(71) Applicant: Vale S.A., Rio de Janeiro (BR)

(72) Inventors: Benjamin David Polzer, Sudbury (CA); Richard Curtis Bailey, Toronto (CA)

(73) Assignee: Vale S.A., Rio de Janeiro (BR)

( * ) Notice: Subject to any disclaimer, the term of this patent is extended or adjusted under 35 U.S.C. 154(b) by 61 days.

(21) Appl. No.: 18/370,709

(22) Filed: Sep. 20, 2023

(65) Prior Publication Data

US 2024/0093757 A1 Mar. 21, 2024

(30) Foreign Application Priority Data

Sep. 20, 2022 (CA) ..................................... 3175615

(51) Int. Cl.
  *F16F 15/16* (2006.01)
  *F16F 9/512* (2006.01)
  *F16F 15/36* (2006.01)

(52) U.S. Cl.
  CPC ............ *F16F 15/161* (2013.01); *F16F 9/512* (2013.01); *F16F 15/366* (2013.01); *F16F 2230/08* (2013.01); *F16F 2232/02* (2013.01); *F16F 2238/04* (2013.01)

(58) Field of Classification Search
  CPC ........ F16F 15/366; F16F 15/36; F16F 15/161; G12B 3/08
  See application file for complete search history.

(56) References Cited

U.S. PATENT DOCUMENTS

| | | | | |
|---|---|---|---|---|
| 3,690,607 A | * | 9/1972 | Mard | B64C 27/001 248/550 |
| 4,295,387 A | * | 10/1981 | Zhivotov | G01M 1/365 73/468 |
| 6,369,573 B1 | * | 4/2002 | Turner | F16F 15/023 324/225 |
| 2011/0175604 A1 | * | 7/2011 | Polzer | G01R 33/022 324/246 |
| 2013/0200248 A1 | * | 8/2013 | Polzer | G01R 33/022 188/266.2 |
| 2015/0034795 A1 | * | 2/2015 | Polzer | B64D 43/00 248/603 |
| 2017/0335915 A1 | * | 11/2017 | Nyboer | F16F 15/366 |

FOREIGN PATENT DOCUMENTS

| | | | | | |
|---|---|---|---|---|---|
| CN | 103760611 A | * | 4/2014 | | G01V 3/165 |
| DE | 2264974 A1 | * | 10/1975 | | |
| DE | 3104465 A | * | 8/1982 | | D06F 37/245 |
| WO | WO-2015173642 A1 | * | 11/2015 | | G01R 1/14 |

OTHER PUBLICATIONS

EPO Machine Translation of the Description of Zivotov et al., DE 3104465 A1, Aug. 19, 1982. (Year: 2025).*

* cited by examiner

*Primary Examiner* — Daniel D Yabut
(74) *Attorney, Agent, or Firm* — ArentFox Schiff LLP

(57) ABSTRACT

An apparatus for rotation rate damping of a suspended platform, the apparatus including a plurality of vertically-extended partially-filled fluid reservoirs, each of the reservoirs being open at a top and offset from a center of gravity of the suspended platform, the reservoirs being connected by tubing permitting fluid to flow between reservoirs in response to gravitational accelerations; wherein motion of the fluid in the tubing creates damping of the rotational motion of the platform.

18 Claims, 9 Drawing Sheets

APPARATUS FOR STABILIZATION OF AN INSTRUMENTATION PLATFORM

FIELD OF THE DISCLOSURE

The present disclosure relates to the stabilization of a suspended platform with potentially multiple dimensions of sway, and more particularly, the disclosure relates to stabilization of a platform found within a moving carrier.

BACKGROUND

Although many moving sensor platforms require some stabilization against angular accelerations to be effective, the need is particularly acute in the case of electromagnetic surveys. Electromagnetic (EM) survey systems detect electromagnetic fields scattered from the Earth, and are widely used for mapping its electrical properties, primarily its variations in conductivity, but also with sensitivity to polarizability, electrical permittivity and magnetic permeability. Certain electrical properties may be associated with different geological features, so electromagnetic survey data may be used to infer the presence or likelihood of various commodities such as petroleum, minerals and ground water.

An electromagnetic survey system generally responds to the presence of time varying electrical current in the ground. The electrical properties of the Earth may be inferred by measuring the time variation of the vector magnetic field with (usually) three magnetic field sensors, each measuring a different vector component. The time varying vector fields can be those of a local transmitter antenna in the case of controlled-source, or the ambient geomagnetic fields in the case of natural-source systems.

The vector component magnetometers are extremely sensitive to changes in their pointing direction as they are coupled to the static magnetic field of the Earth so that small changes in the pointing direction can create signals which are unrelated to the electrical properties of the Earth. The sensor is thus relatively insensitive to linear velocities through the relatively homogeneous static magnetic field of the Earth, but very sensitive to angular velocities. Noise caused in this way is often called "motion noise" even though it arises from rotation and not linear motion.

A moving electromagnetic survey system may use a moving carrier to transport and support the magnetic field sensor as data are being acquired. In a moving electromagnetic survey system, the carrier may comprise a towed bird (or sonde) that may be suspended below an aircraft from a tow cable. Popular varieties of airborne electromagnetic (AEM) prospecting systems tow a bird below a helicopter, typically with a tow cable ranging from 30 to 90 meters in length. AEM surveys are typically configured to cover an area with parallel flight lines separated with fixed lateral separation.

Movement of the towed bird or sonde may cause an instrumentation platform within the carrier to experience both linear and angular accelerations. Isolation of the angular accelerations of the carrier from the sensors is an important part of all AEM receiver systems. This is often accomplished by suspending the sensors, usually affixed to a common "instrument platform" from the carrier. These arrangements have a complex behavior where linear accelerations and angular accelerations are mostly reduced but they are coupled, whereby a linear acceleration of the carrier can create an angular acceleration of the instrument platform.

To improve the isolation of the angular accelerations, some suspension designs utilize instrument platforms of high stiffness and high moments of inertia which are center supported on an almost frictionless mount and are balanced almost perfectly with respect to their center of rotation, as is for example described in U.S. Patent Publication No. US20110175604). While providing superb isolation between both linear and angular accelerations of the carrier and the angular accelerations of the sensor platform, such designs suffer from a problem; they oscillate rotationally at a low rate and such oscillation can build up over time causing the instrument platform to hit support members, this will cause jarring (sudden acceleration) of the sensitive instruments, which can lead to erroneous data. In this regard, a damping system which would remove rotational energy of the instrument platform without impairing the effectiveness of isolation would be beneficial.

SUMMARY

The present disclosure provides apparatuses for rotation rate damping of an instrument platform, for example those supported by the kind of suspension described by US Patent Publication No. 20110175604. In some embodiments the rotation rate damping is performed in a way that minimizes the creation of vibrations from the damping system itself. In some embodiments, the rotation rate damping uses no electrical components and is self-contained. In some embodiments, the rotation rate damping apparatus is used on a platform for acquiring electromagnetic survey data from a moving carrier. Some embodiments disclosed herein may allow for acquiring electromagnetic survey data with low motion noise. The apparatus disclosed herein may be deployed in mobile or stationary carriers to acquire EM data in the air, on the ground and on or under the sea. Stationary carriers may be moving due to vibrations. Embodiments are not limited to only electromagnetic survey data acquisition. The apparatuses described herein may also be suitable for implementation in other applications where reduction of pendular or periodic motion noise is desirable.

Some aspects of the disclosure may permit electromagnetic data with low motion noise to be acquired by mounting one or more vector component EM sensors on a bottom weighted instrument platform. The instrument platform may balance on a bearing that supports its weight. In so doing, the instrument platform may be substantially decoupled from the carrier's motions within a bandwidth.

According to one aspect, there is provided an apparatus for rotation rate damping of a platform, the apparatus comprising: a plurality of fluid-containing reservoirs, connected so that fluid may flow between the reservoirs in response to real or apparent gravitational accelerations caused by platform rotation, thus dissipating the rotational energy of the platform.

In one embodiment the reservoirs are arranged in pairs, each reservoir in a pair of reservoirs being affixed to the platform at a position diametrically opposed to the other reservoir in the pair of reservoirs, the plurality of pairs of reservoirs being evenly spaced about the platform; and tubing extending around a periphery of the platform or extending along a diameter of the platform through its center, and fluidly joining each of the pair of reservoirs; wherein motion of fluid in the tubing between each pair of reservoirs creates rotation rate damping of the platform.

In one embodiment the tubing extends in two half rings about opposite sides of the platform between the pair of reservoirs.

In one embodiment each reservoir contains hollow shafts therein to prevent sloshing of the fluid.

In one embodiment the reservoir contains at least two bundles of hollow shafts, the apparatus further comprising a separator between the bundles of hollow shafts allowing fluid to flow from hone hollow shaft to another hollow shaft.

In one embodiment the separator is configured to block a subset of hollow shafts, thereby allowing tuning of the motion damping by adjusting the extent of blocking of the fluid flow.

In one embodiment the apparatus further comprises a fluid permeable layer under the bundle of hollow shafts to allow fluid to flow into the tubes.

In one embodiment each hollow shafts is dimensioned to minimize a diameter while allowing flow of the fluid without producing significant surface tension effects.

In one embodiment the tubing fluidly connects all pairs of reservoirs with a single tube.

In one embodiment the platform contains instrumentation for Audio Frequency Magnetic (AFMAG) exploration.

In one embodiment the platform contains instrumentation for Controlled-Source Airborne EM (AEM) exploration.

In one embodiment the tubing is connected to each reservoir of the pair of reservoirs using a T-junction.

In one embodiment the T-junctions is dimensioned to avoid creating turbulence in the fluid.

In one embodiment each reservoir includes a port at the upper surface thereof for air ingress into the reservoir or egress from the reservoir.

In one embodiment the platform rests on a single pivot point.

In one embodiment using two orthogonally-offset pairs of reservoirs, the system is designed to adhere to:

$$\frac{2\rho A D^2}{MH} < 1 \qquad (1)$$

where ρ is a density of a working fluid; A is the fluid surface area in each reservoir; D is the horizontal offset of each reservoir from a suspension point; M is a mass of the platform, including the apparatus; and H is a distance between the suspension point and a center of mass.

In one embodiment the apparatus is tuned to cause the left side of the ratio to approach but not exceed 1.

In one embodiment each reservoir contains a baffle apparatus, the baffle apparatus comprising a plurality of hollow shafts therein, wherein the apparatus is tuned by blocking a subset of the hollow shafts.

In one embodiment fluid flow through the tubing is laminar.

Other aspects and features of the present disclosure will become apparent, to those ordinarily skilled in the art, upon review of the following description of the specific embodiments.

BRIEF DESCRIPTION OF THE DRAWINGS

Aspects and embodiments of the disclosure will now be described in greater detail with reference to the accompanying diagrams, in which.

DETAILED DESCRIPTION

Figure 1A:
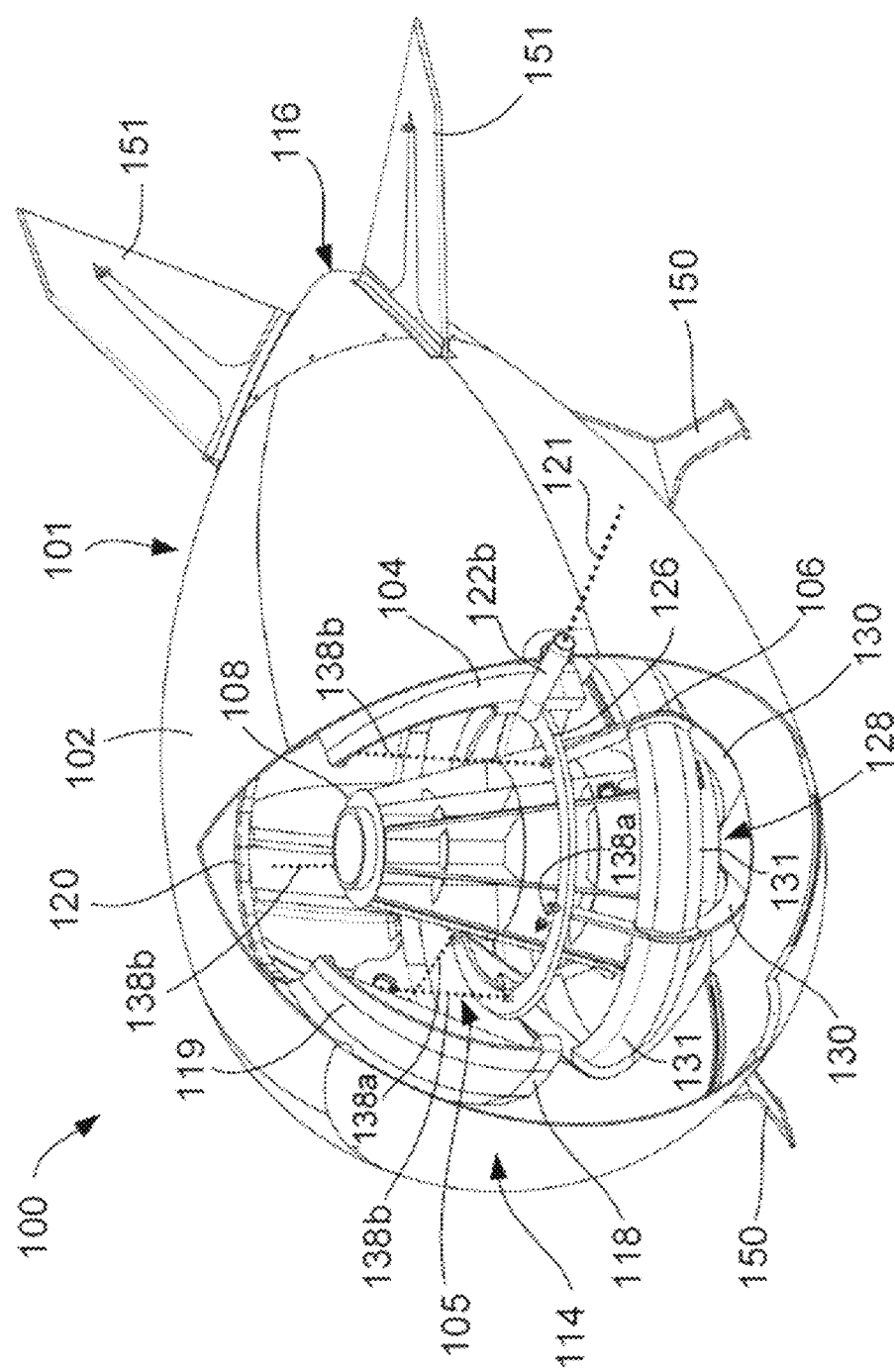
FIG. 1A is a perspective view of an apparatus for data acquisition, according to some embodiments, in which a carrier shell is shown partially cut away.

To detect the presence of deep geological features, it is advantageous to acquire low frequency EM data with picoTesla sensitivity. Presently, AEM systems are typically limited to acquiring data at frequencies of 25 Hz and above where if is possible to design rotation rate isolation systems for the sensors using arrangements of elastomer members supporting the platform from the carrier. Below this frequency the effectiveness of these systems becomes limited by the size and weight constraints while, at the same time the amplitude of accelerations of the carrier become much larger due to aerodynamic effects. This results in an unacceptable levels of motion noise. Acquiring data in the sub-25 Hz range would allow geological features to be detected that may be undetectable with present-day AEM systems.

Electromagnetic survey systems generally detect EM fields with vector component sensors. Many kinds of vector component magnetic (EM) sensors may be used to make an electromagnetic field measurement, including search coils, feedback coils, squids, fiber-optic and fluxgate magnetometers. In cases where the magnetic field is detected with a coil, in accordance with Faraday's Law, the EMF output from the coil becomes proportionally weaker with decreasing frequency, and so larger sensor coils may be required to compensate for decreasing sensitivity at low frequencies. Electromagnetic sensors may be "DC-Coupled", having sensitivity to a steady-state field or "AC-Coupled" having no sensitivity to a steady-state field.

EM survey systems are distinct from magnetic survey systems, which measure the static magnetic field of the Earth. The latter is generally concerned with measuring the spatial variations in the Earth's static magnetic field that are generally attributed to spatial magnetic permeability variations in the Earth. The time varying field may be orders of magnitude smaller than the static field, often by factors of millions. Making a high-quality electromagnetic measurement therefore requires limiting the motion of a vector component EM sensor in the static magnetic field over the duration of a measurement. As lower frequency electromagnetic data are acquired, the duration over which this motion should be limited increases. At low frequencies, the stability of a vector component EM sensor often becomes a paramount consideration.

In this regard, techniques for reduction of rotational motion are described in U.S. patent Ser. No. 10/838,100, the contents of which are incorporated by reference herein.

Specifically, to control motion noise, it is desirable to isolate the angular motion of the sensor from the angular motions and vibrations of the carrier. Conventional airborne electromagnetic systems have employed elastomer suspensions for this purpose. They have not generally been able to achieve the high degree of stability required to reduce motion noise to acceptable levels at frequencies below 25 Hz. The systems disclosed herein may be particularly suited for airborne electromagnetic surveying in the 1-25 Hz range.

According to various embodiments of the present disclosure, motion and damping assistance are provided. In particular, the rotation rate damping devices are provided to reduce the rotation rate of a platform suspended on a frictionless air bearing. However, the present disclosure is not limited to the particular use of the instrumentation platform, or indeed to the use of the damping system with an instrumentation platform. Rather, the present disclosure may be generalized to the multi-dimensional rotation rate damping of a platform. The use of an instrumentation platform for AEM systems is therefore provided for illustration purposes only.

In the embodiments described herein, damping uses forces exerted by gravity on movable masses internal to the instrumentation platform, where the timing of the motion is such as to make the gravitational forces retarding in nature, on average. Thus, in some cases, the embodiments of the present disclosure may be referred to as "internal mass displacement damping systems."

In some embodiments, the natural pendular frequency of the instrument platform may have a period longer than 1 second and shorter than 1000 seconds. An airborne electromagnetic survey system may include this apparatus, having the bottom weighted instrument platform and base assembly, supported by a tow frame within a housing, as described below. However, as noted above, the apparatus may also be configured for use in non-airborne data acquisition systems as well.

FIG. 1A is a partially cutaway perspective view of an AEM data acquisition apparatus 100 according to some embodiments. The example apparatus 100 is configured for airborne data acquisition, although embodiments are not limited to airborne systems. The example apparatus 100 includes: a carrier 101 comprising a carrier shell 102 and a tow frame 104 mounted within the carrier shell 102; a base assembly 106 coupled to the tow frame 104 by a linkage 105 (comprising the cable isolation system 123 shown in more detail in FIG. 1B in this example); a spherical bearing 110 (shown in FIG. 1B) on the base assembly; and an instrument platform 108 mounted spherical bearing 110. The instrument platform 108 in this example has vector component EM sensors 146 fixed thereto.

For example, in an embodiment, three EM sensors 146 are each mounted on the platform body 108 between a respective pair of longitudinal support members 180 (shown in FIG. 2) on the conical skirt of the instrument platform. The EM sensors 146 are vector component electromagnetic sensors in this example, although other sensor types may be used.

The EM sensors 146 may each be a feedback magnetometer with an acquisition band extending from 1 Hz to 25 KHz. The EM sensors 146 are rigidly affixed to the instrument platform in this embodiment. The EM sensors 146 in this example are spaced equally around the circumference of the conical skirt of the instrument platform. However, it is to be understood that the number, type and positioning of sensors in other embodiments may vary. Some embodiments may include four or more sensors. Some sensors may be independently oriented. Furthermore, one or more sensors may be swapped or interchanged in some embodiments. In embodiments suitable for natural field electromagnetic surveys, an EM sensor may, for example, operate in an acquisition band between 8 and 700 Hz. In an embodiment suitable for controlled source electromagnetic surveys, the EM sensor may, for example, operate in an acquisition band between 1 and 25,000 Hz and may have a sub-picoTesla noise floor at 1 Hz. In some embodiments, the EM sensor may be a vector component magnetometer.

In some embodiments, the carrier 101, including the carrier shell 102 and the tow frame 104, and the linkage 105 are omitted. The apparatus in other embodiments may simply comprise a base assembly and an instrument platform coupled to the base assembly by a spherical bearing. The apparatus may be used with a different carrier or may be used in isolation. For example, the apparatus may be towed on a trailer. In other embodiments, the apparatus may be mounted or suspended within the vehicle itself. In still other embodiments, the apparatus may be mounted on a substantially stationary position (e.g. on a platform or building) where small motion and/or slow motion over time may still be present.

The carrier 101 in FIG. 1A is a moving carrier in that it is configured to be towed by an airplane or other airborne vehicle. The term "moving carrier" herein does not mean that the carrier is always moving, but rather the carrier may be configured for moving data acquisition. For example, other moving carriers such as trailers, towed platforms, or other means for coupling the carrier to a vehicle may be used in other embodiments.

Embodiments are not limited to the apparatus being actively moved by a vehicle. Naturally occurring movement in the ground, a structure or building may, for example, cause motion noise within an acquisition band in some applications even when the apparatus is substantially stationary. In such cases, a bottom-weighted instrument platform on a spherical bearing may reduce such motion noise.

When configured for airborne use, the carrier shell (or bird shell) 102 may be generally tear shaped with a bulbous, rounded front end 114 and a tapered tail 116 as illustrated. The carrier shell 102 may be weatherproof. The tear drop shape may be a suitable aerodynamic shape for airborne sensing, although other shapes may be used. The carrier shell 102 is partially cut away to show the tow frame 104, base assembly 106 and the instrument platform 108. Fins 151 near the tail end 116 may provide some stability in flight. The carrier shell 102 is provided by way of example, and it is to be understood that other shell shapes and arrangements may be used for airborne carriers. Embodiments are not limited to the particular shape of the carrier shell 102 when a carrier is used.

The tow frame 104 in FIG. 1A includes a base support ring 118 and an upper support ring 120. Split tow axles 122*a* (FIG. 1B) and 122*b* extend away from the base support ring in opposite directions and extend outward through the carrier shell 102. Cable 103 (shown in FIG. 1B) may attach to the axles 122*a* and 122*b* of the apparatus 100 to an airborne vehicle (not shown). The upper support ring 120 may, for example, have a diameter that is approximately half that of base support ring 118. In this example, the upper support ring 120 is displaced upwards from the base support ring 118 by a distance approximately equal to its diameter. The upper and base support rings 120 and 118 are interconnected by a generally hemispherical monocoque shell 119. The axles 122*a* and 122*b* are pivotally connected to the carrier shell 102 and the tow frame 104 has a size and shape to allow for relative rotation of the tow frame 104 in the carrier about the horizontal axis 121 that runs through the split tow axles. The tow frame 104 is provided by way of example, and it is to be understood that other structures may be used to couple a base assembly (such as base assembly 106) to a carrier (such as carrier 101). For example, the base assembly may be suspended by one or more cables from an anchor or bracket located at or near the top of the carrier shell in other another embodiment. In other embodiments, the base assembly 106 may be coupled directly to the axles 122*a* and 122*b*. Embodiments are not limited to the example structure of the tow frame 104.

Although not shown in FIG. 1A, the cable isolation system 123 (shown in FIG. 1B) forms the linkage 105 between the base assembly 106 to the tow frame 104 in this example embodiment. The structure of the tow frame 104 is shown by way of example, and other tow frame or assembly structures may be used in other embodiments. For example, other suitable tow frame structures are disclosed in Polzer et al. in U.S. Patent Application Publication Nos. 2015/0034795 and 2011/0175604, which are incorporated herein by reference.

The base assembly 106 in this example comprises an upper ring-shaped rim 126 and a lower base 128 with spaced apart ribs 130 extending therebetween. The ribs 130 interconnect the base 128 and the upper rim 126. The ribs 130 are each attached to the upper rim 126. The ribs 130 extend downward, initially outward, and then curve inward to meet at the base 128. In this example, six ribs 130 are spaced apart evenly about the upper rim 126. Thus, adjacent ribs 130 are angled approximately 60 degrees with respect to one another. Other embodiments may use a different base assembly structure and may include more or fewer ribs.

Figure 1B:
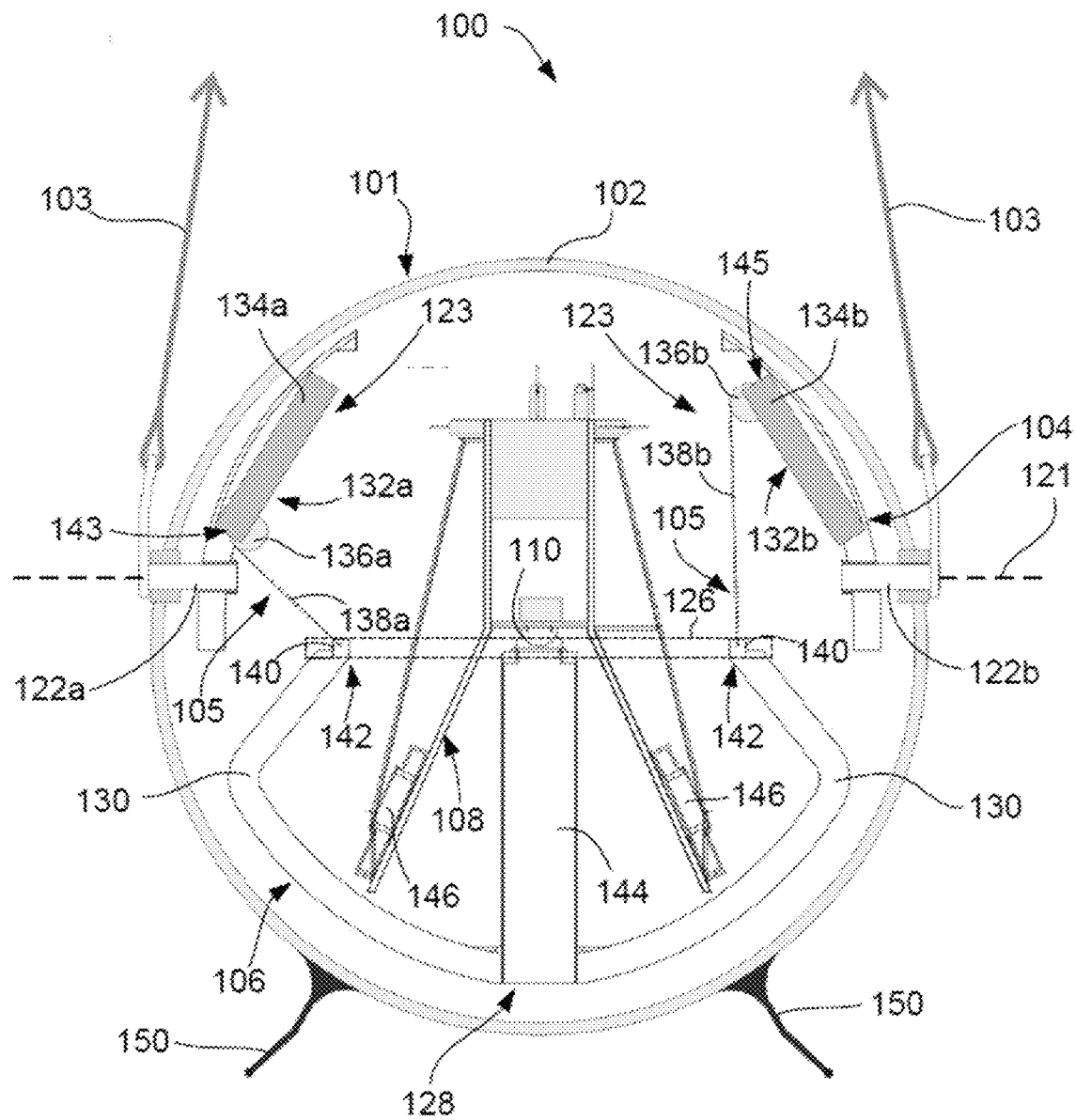
FIG. 1B is a front cross-sectional view of the apparatus of FIG. 1A.

FIG. 1B is a front cross-sectional view of the apparatus 100 of FIG. 1A. The linkage 105 between the tow frame 104 and the base assembly 106 in this example is a cable isolation system 123, and is but one possibility. However, it is to be understood that other linkage structures may also be used. See, for example, the vibration isolating damper system described by Polzer et al. in U.S. Patent App. Publication No. 2011/0175604, which is incorporated herein by reference.

The cable isolation system 123 comprises a plurality of pneumatic cable isolators 132*a* and 132*b*, one for each rib 130. Each cable isolator 132*a* and 132*b* is attached to the interior of the tow frame 104 and is aligned with a corresponding rib 130 of the base assembly 106. In this example, there are six cable isolators 132*a* and 132*b* in total (one for each rib 130). Each cable isolator 132*a* and 132*b* is in the form of a pneumatic air cylinder bearing as disclosed by Polzer et al in U.S. Patent Application Publication No. 2015/0034795. Each cable isolator 132*a* and 132*b* comprises a pair of air pistons (not shown) supported in cassette 134*a* or 134*b*. The air pistons have ends terminating on a common cross member (not shown) in this example. Each cable isolator 132*a* and 132*b* further includes a respective pulley 136*a* or 136*b* and cable 138*a* or 138*b*. Each cable 138*a* and 138*b* is attached to the respective cassette 134*a* or 134*b* and threaded over the respective pulley 136*a* or 136*b* to support the weight of base assembly 106. The cables 138*a* and 138*b* each terminate at a respective fixture 140 at an end 142 of the corresponding rib 130.

In this example, three cable isolators 132*a* are arranged with the cable 138*a* extending from a lower end 143 of the cassette 134*a*, such that the cable 138*a* extends in a partially lateral direction to the corresponding rib 130. The other three cable isolators 132*b* are arranged with the cable 138*b* extending from an upper end 145 of the cassette 134*b*, such that the cable 138*b* extends downward in a substantially vertical direction to its corresponding rib 130, as shown.

The ring-shaped rim 126 shown in FIG. 1A is shown as transparent using stippled lines in FIG. 1B so that the spherical bearing 110 is visible. Moving around the rim 126, the cable isolators 132*a* and 132*b* are arranged in an alternating fashion, such that each rib 130 that is connected to a vertically aligned cable 138*b* is adjacent to two ribs 130 with a partially lateral cable 138*a*, and vice versa. Dotted lines illustrating positions of cables 138*a* and 138*b* are also shown in FIG. 1A. The air pistons of the cassettes 134*a* and 134*b* may dampen the vibrations of the carrier 101 on base assembly 106. Each vertically supporting cable isolator 132*b* is spaced, in a horizontal sense, equidistantly between neighboring laterally supporting cable isolators 132*a* in this embodiment. Vertical and horizontal vibrations of the carrier shell 102 and tow frame 104 may thereby be dampened by the cable isolators 132*a* and 132*b*.

With reference to FIG. 1B, the base assembly 106 comprises a pedestal 144 that extends upward from the base 128 to support the instrument platform 108 via the spherical bearing 110. The ribs 130 undergird pedestal 144, which rises vertically from the meeting point of the ribs 130 to support the spherical bearing 110 on which the instrument platform 108 sits. The pedestal is in the form of a post in this embodiment, but other pedestal structures may be used in other embodiments. The term "pedestal" used herein does not require that the pedestal extend upwardly from a base structure. For example, the pedestal may comprise one or more arms that extend at least partially horizontally or at an angle. The pedestal may be any structure suitable to support the spherical bearing and instrument platform.

Collectively the plurality of ribs 130 form a cavity to partially receive the instrument platform 108 therein and to permit the instrument platform 108 to rotate about spherical bearing 110 without colliding with the cavity sides, as best shown in FIG. 1B. In this example, the ribs 130 are structurally supported by optional panels 131.

The instrument platform 108 in this example is rigid and holds a plurality of vector component sensors 146. The instrument platform 108 may be "rigid" in that motion noise associated with deformations of the instrument platform 108 is small relative to other motion noise. The sensors 146 may be electromagnetic (EM) vector component sensors. In some embodiments, the sensors 146 may comprise three or more sensors. For example, the vector component sensors 146 may include three independently oriented vector component sensors. Some embodiments may include four or more sensors. Embodiments are not limited to particular number or arrangement of vector component sensors. The instrument platform 108 is bottom weighted such that its center of gravity is below its center of rotation about the spherical bearing.

In an alternative embodiment, the spherical bearing may be affixed directly to, or supported directly by to the carrier 101. In some embodiments, the base assembly may be part of or incorporated into the carrier. For example, in some embodiments, the spherical bearing may be mounted to the carrier, a portion of the carrier thereby functioning as the base assembly.

In some embodiments, the support of the spherical bearing 110 within the carrier may comprise features disclosed in U.S. Patent App. Publication No. 2011/0175604 (Polzer et al.).

In some embodiments, linkage between the carrier 101 and the base assembly 106 is not a cable isolation system. In some embodiments, the linkage may comprise the pneumatic vibration damping and associated systems disclosed by Polzer et al in U.S. Patent App. Publication No. 2013/0200248 (A1) and, the contents of which are incorporated herein by reference. Compressed air may be supplied from an air supply pump mounted on a tow cable and fed into the carrier through an air supply tube mounted on the tow cable.

The carrier 101 may be stabilized for airborne towing by configuring its weight distribution such that the weight of the carrier and its contents below the axis 121 is greater than the weight above it.

When the carrier 101 is lifted by an airborne vehicle, the weight is borne by its axles 122a and 122b. Carrier shell 102 may pivot about axis 121, and may not apply torque to the inner systems which may maintain their roughly upright orientation. As the vehicle begins to move forward, the air flow around the carrier shell 102 may cause the carrier shell to rotate about the horizontal axle 121. Because the carrier shell is pivotally connected to axles 122a and 122b, any such rotation may be substantially decoupled from the tow frame 104 and thus from the instrument platform 108 it supports.

Figure 1C:
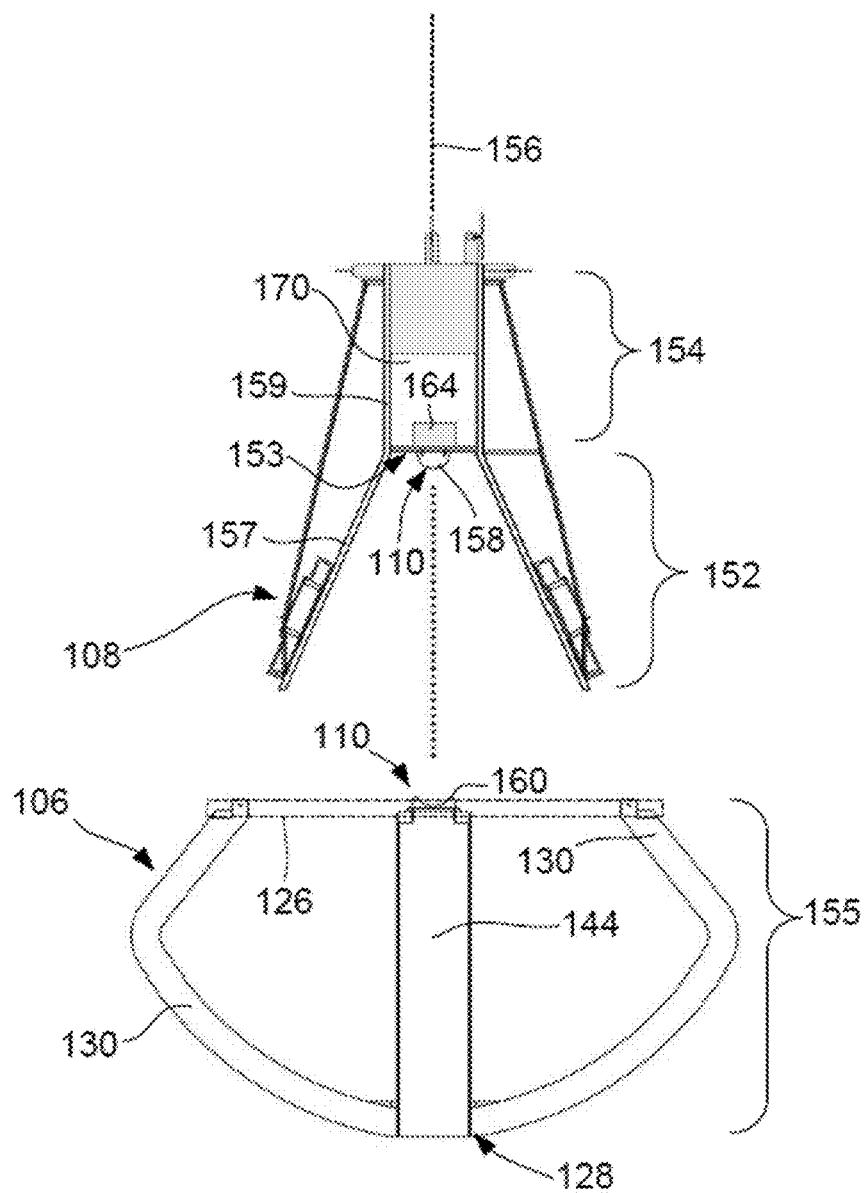
FIG. 1C is a partially exploded cross-sectional view of an instrument platform, a spherical bearing and base assembly of the apparatus of FIGS. 1A and 1B.

FIG. 1C is a cross sectional, exploded view of the base assembly 106, the spherical air bearing 110, and the instrument platform 108 in isolation according to some embodiments. The ring shaped rim 126 shown in FIG. 1A is shown as transparent using stippled lines in FIG. 1C so that the spherical bearing 110 is visible. The instrument platform 108 in this example has a lower portion 152 that comprises hollow cone (which may be a frusto-cone) 157 with an upper inside apex 153 that is engaged to and supported on the spherical air bearing 110. The instrument platform 108 also has an upper portion 154 that comprises a cylindrical part or stem 159 that extends upwardly from the cone 157, above the apex 153 and into the downward facing hemispherical cavity formed by the tow frame 104 (shown in FIGS. 1A and 1B). The instrument platform's principal axis 156 extends through the cone 157 and the stem 159. The spherical bearing 110 provides for low friction, or virtually frictionless rotation of the instrumentation platform's principal axis 156, referred to as "pivotal rotation" or "roll and pitch" as well as the rotation of the platform about its principal axis 156 which is referred to as either "rotation" or "yaw". The spherical bearing 110 is the sole mechanical coupling between the base assembly 106 and the instrument platform 108 in some embodiments.

The base assembly 106 includes a main base portion 155 (comprising the ribs 130, base 128 and rim 126) and the pedestal 144 in the form of a post which securely affixed to and extends upwardly from the main base portion 155. The ribs 130 of the base assembly 106 are sized and angled to accommodate a 10 to 30 degree roll and pitch range of the instrument platform 108 on the spherical air bearing 110.

Embodiments are not limited to the specific example structure of the base assembly 106 shown in FIGS. 1A and 1B. For example, in another embodiment, the base assembly may simply comprise a block with a pedestal thereon for supporting a spherical bearing and instrument platform. Any suitable structure for supporting the spherical bearing and instrument platform may be used.

The spherical bearing 110 in this embodiment includes a protruding, rounded part 158 attached to the instrument platform 108 and a seat 160 attached to the pedestal 144. The protruding part 158 mates with the seat 160 to allow low friction or virtually frictionless rotation.

Shielded electronics bay 170, which may house high precision-three component accelerometer 164 or electrically noisy components in some embodiments, is also shown in FIG. 1C.

Figure 1D:
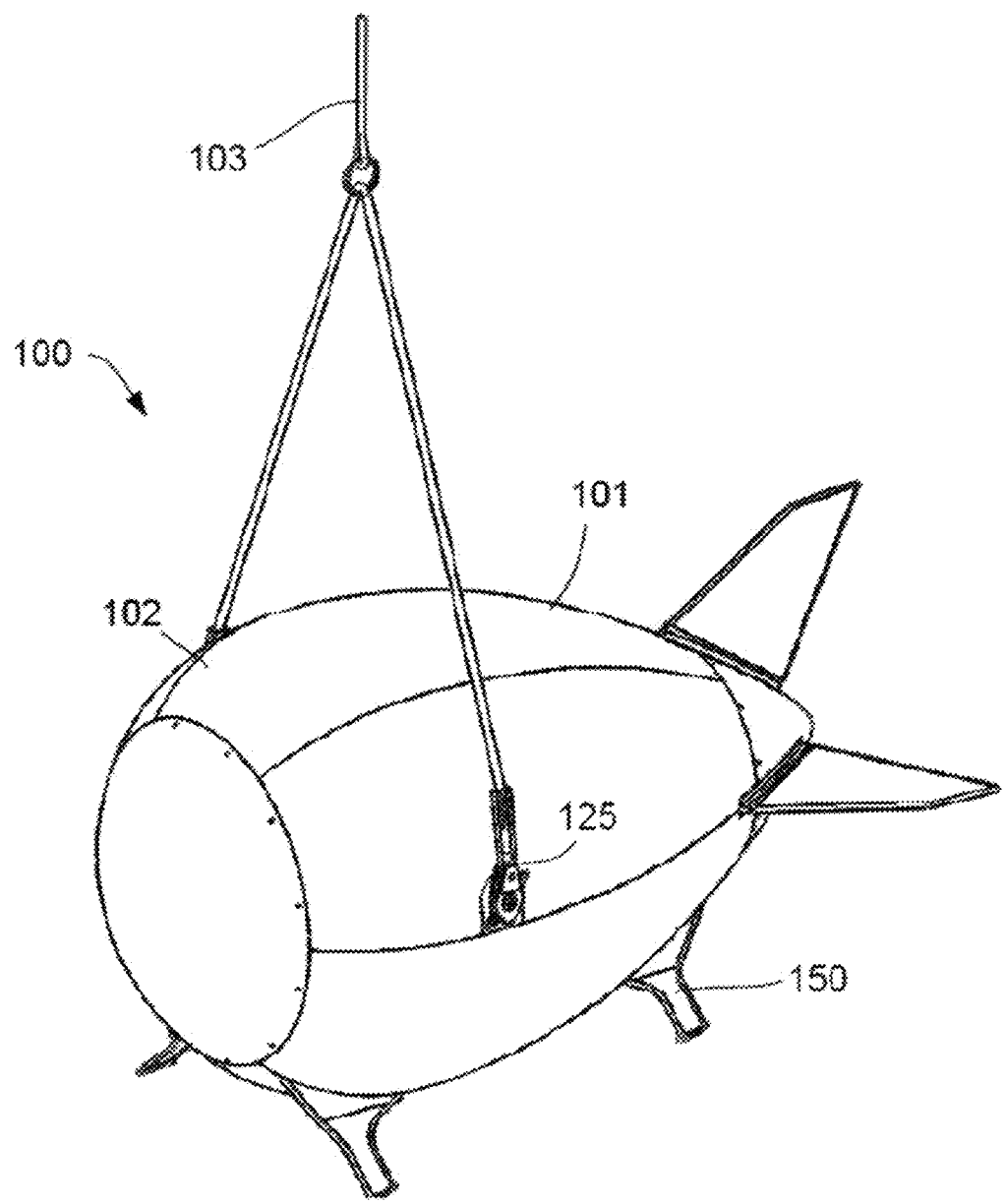
FIG. 1D is a perspective view of the apparatus of FIGS. 1A and 1B.

FIG. 1D is a perspective view of carrier 101 and cable 103. The carrier 101 is suspended from either side by the tow cable 103 which is attached to the aircraft (not shown). The tow cable 103 may split to form a pair of tow cables with the shape of an inverted "Y," where the twin prongs of the inverted "Y" are affixed to opposite sides of the carrier 101. In this embodiment, the tow cable 103 ends are affixed to rigid tow arms 125, which fixedly transfer supporting forces through axles 122a and 122b to the tow frame 104 (shown in FIGS. 1A and 1B) and carrier shell 102. In other embodiments, the tow cable 103 may attach directly or otherwise support tow frame and carrier shell. Any suitable method to connect the carrier 101 to a vehicle may be used.

Landing support feet 150 bear the weight of the carrier when it is landed on the ground. When the carrier is landed, tow cable 103 is slack and may lay on the ground. FIG. 1B illustrates the tow cable configuration for a case when the carrier may be airborne and supported by the tow cables.

As provided in FIGS. 1A to 1D above, EM sensors 146 are mounted to a platform 108. This platform is suspended in a towed airborne enclosure. The EM sensors 146 are very sensitive magnetometers or "coils", whose orientation in space must be kept as constant as possible. This is difficult because of buffeting by air flow, as well as irregular jerking and vibrating of the tow line from the towing vehicle. The suspended cone or platform 108 both swings and rotationally vibrates.

These variations in orientation cause spurious signals to contaminate the desired coil sensor measurements. Specifically, orientation changes are a problem, not position or velocity changes. Orientation changes or oscillations at high frequencies produce much larger spurious signals than low frequency changes or oscillations. For this reason, platform 108 can swing many degrees at a slow pendulum swing without compromising the coil signals from EM sensors 146, as long as the platform 108 does not actually collide with the walls of enclosure 106. In some embodiments, this may happen at about a 20 degree tilt. However, other embodiments would have different tilt angles before collision occurs.

Further, much higher frequency vibrations typically generate unacceptable levels of spurious signals if they are allowed to vibrate the orientation of platform 108, for example even by one thousandth of a degree. For example, if the towing vehicle is a helicopter, helicopter rotor vibrations transmitted down the tow cable at approximately 20 cycles per second will generate unacceptable levels of spurious signals. Therefore, the present disclosure is also directed to high frequency (vibrational) isolation systems utilizing internal mass displacement damping.

In the embodiments described, the solutions address the problem of minimizing the effects of external forces and vibrations on the platform 108 orientation.

As noted from FIGS. 1A to 1D above, external forces may be minimized by suspending the platform 108 on a nearly frictionless air bearing, with the centre of mass more or less coincident with the suspension point. The whole assembly is then mounted inside a large enclosure to protect it from air flow. Therefore, any motion imparted on the cone must come only through the motion of the suspend point, the cones only mechanical attachment to the enclosure. If the suspension point actually coincides with the centre of mass, then suspension point motions cannot induce any rotational motion of the cone, because the length of the relevant driving torque arm is zero.

However, this idealized system is not very practical because the cone orientation is metastable. In other words, it is equally stable in all orientations. Therefore, there is nothing to ensure that the cone stays more or less right side up in response to most minor perturbations such as weak air currents within the enclosure. Gravity has no ability to turn or restore platform 108 to an upright position. Yet, if the platform 108 deviates more than about 20 degrees from vertical, it collides with the inside of the enclosure, which is undesirable for the reasons noted above. A solution to this was to lower the centre of mass of platform 108 below the suspension point. However, too much lowering and the system will swing too much when the enclosure are moved laterally by towing forces and air flow.

In this regard, the center of mass may be lowered only slightly below the suspension point. For example, a suspension point of only 400 microns above the center of gravity has been found in practice to produce a pendulum or swinging motion period of nearly one minute, which is slow enough that spurious signals generated by swinging are not a problem. Other distances between the suspension point and the centre of gravity are however for possible.

However, even despite this tiny torque arm length on which suspension point forces act, it has been found in practice that in a pass over a region of interest the lateral acceleration suffered by the towed systems were often sufficient to build a significant rotation of platform 108 away from vertical. In many cases, the rotation could often exceed the peak deviation from vertical to cause the platform 108 to collide with base 106. This collision causes large, and thus undesirable, changes in the swing rate and orientation and, in turn, generates unacceptably large spurious signals on the EM sensors 146.

Therefore, damping of the platform is needed. However, damping a swinging motion cannot introduce other problems. Specifically, no added vibrational torques may be added to the platform 108 utilizing a damping system since such added vibrational torques would cause spurious signals at EM sensors 146. For example, a classic method of damping is to use shock absorbers or damping pistons connected between the platform 108 and base. However, this arrangement would transmit some high frequency rotations of the base into the platform 108, destroying the isolation provided by the zero-friction air bearing.

In general, mechanical dampers do not have vibration isolation requirements. In the present embodiments, systems for torquing the cone to a state of reduced rotation rate in which no additional high frequency forces are transmitted from the enclosure to the cone are provided. This is done utilizing gravity, which exerts a constant force that is entirely uninfluenced by motions and vibrations in the towed enclosure.

Figure 2:
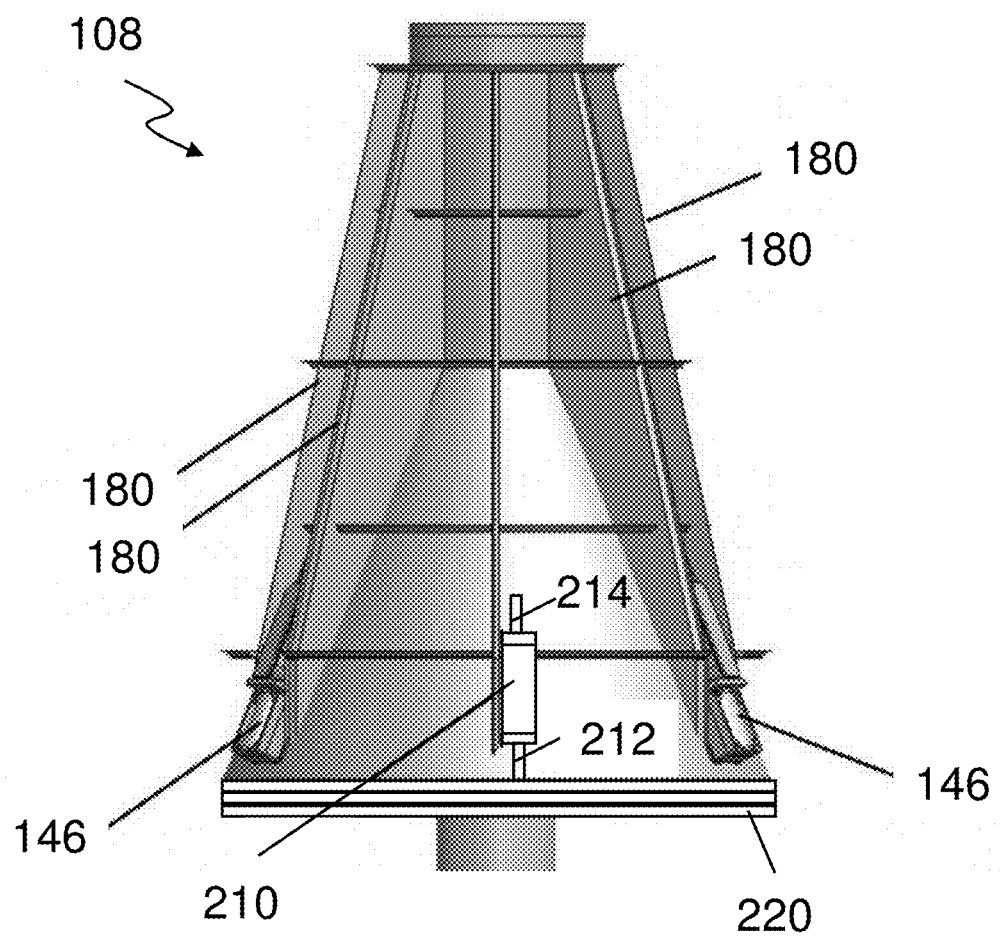
FIG. 2 is a side elevational view of a platform having a rotation rate damping apparatus affixed thereto.

For example, reference is now made to FIG. 2. The embodiment of figure two shows a platform 108, similar to the platform described above with regard to FIGS. 1A to 1D. In the embodiment of FIG. 2, a rotation rate damping system has been added. In particular, the rotation rate damping system of FIG. 2 comprises a plurality of reservoirs 210 fixed to support members 180. Further, one or more tubes 220 are connected to reservoir 210 utilizing a connector 212. The tubes 220 extend about a periphery of the platform 108 and may be connected, for example, to connector 212 utilizing a T-junction.

An air port 214 allows the ingress and egress of air into reservoir 210. Air port 210 may simply be an opening at the top of reservoir 210 in one embodiment. In other embodiments, air port 214 make comprise a tube extending above reservoir 210, thereby ensuring liquid does not overflow the reservoir.

In one embodiment, a plurality of reservoirs 210 may be fixed about platform 108 and be connected with a single tube 220. The reservoirs 210 may, in this embodiment, be evenly distributed about the platform 108 to ensure that the weighting and balance of platform 108 remains consistent.

Figure 3:
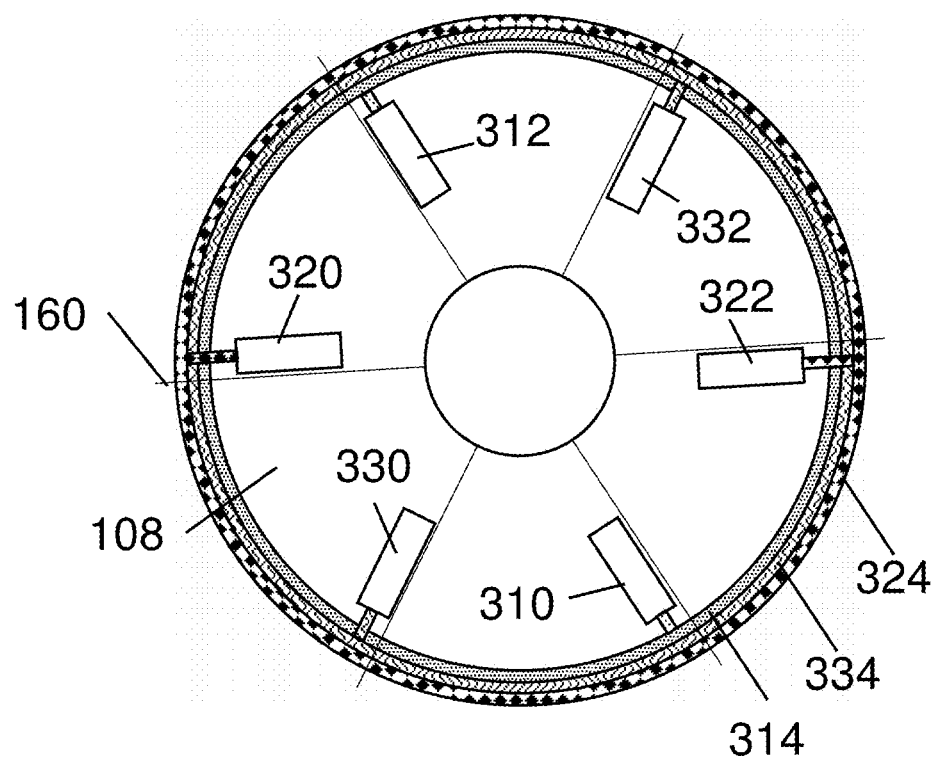
FIG. 3 is top plan view of a platform having a plurality of pairs of reservoirs used for rotation rate damping affixed thereto.

In other embodiments, diametrically opposed reservoirs may be paired, with each pair of reservoirs being connected by tubing. for example, reference is now made to FIG. 3. in the embodiment of FIG. 3, three pairs of reservoirs are provided. However, in other cases more pairs of reservoirs or fewer pairs of reservoirs may be used. For embodiments other than two orthogonal pairs of reservoirs, formula (1) may be suitable modified.

Thus, in the embodiment of FIG. 3, reservoir 310 may be fluidly connected to reservoir 312, which is diametrically opposed to reservoir 310. The fluid connection may include a tube 314. Tube 314 may be a single tube with two T-junctions for connecting reservoirs 310 and 312. In other cases, tube 314 may consist of two semi-hemispherical tubes extending about opposite sides of the periphery of platform 108. In this way, when liquid is transferred between reservoir 310 and reservoir 312, it may flow about both sides of platform 108, thereby preventing imbalances and torques. Specifically, the use of the ring about the platform 108 nulls the torques about the z axis caused by the acceleration of the fluid as it passes from reservoir to reservoir.

Similarly, reservoir 320 may be fluidly connected to reservoir 322 utilizing tubing 324.

Similarly, reservoir 330 may be fluidly connected to reservoir 332 utilizing tubing 334.

As seen in the embodiment of FIG. 3, reservoirs 310, 312, 320, 322, 330, and 332 are evenly distributed about the platform 108. For example, if three pairs of reservoirs, or six reservoirs in total, are provided about platform 108, then each could be spaced at a 60 degree angle from the next reservoir.

Figure 4:
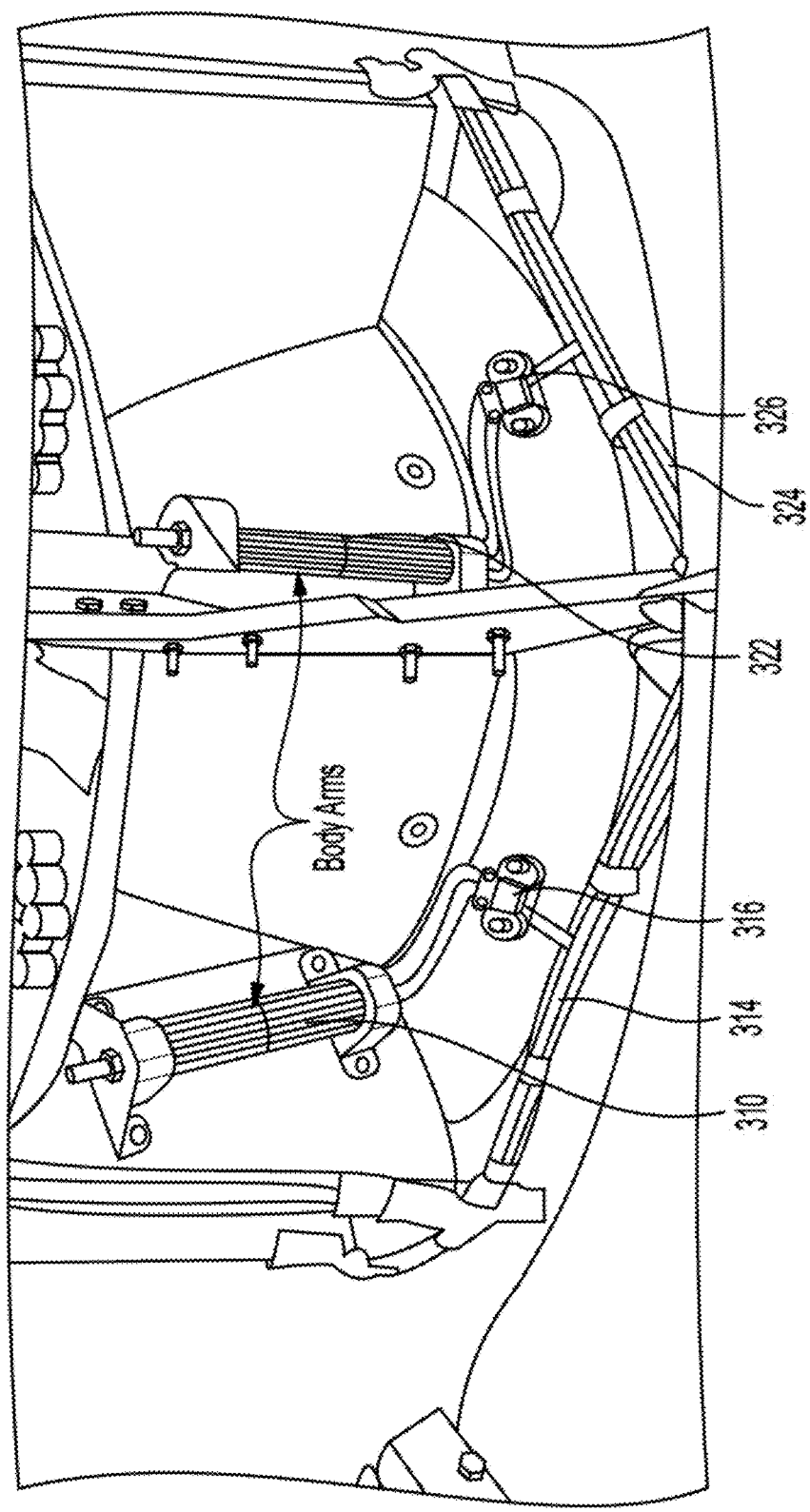
FIG. 4 is a perspective view of a portion of a platform having a rotation rate damping apparatus affixed thereto.

In some cases, the tubing may be clamped to the platform 108 to avoid vibrations. For example, referring to FIG. 4, this figure shows a perspective view of the embodiment of FIG. 3. In the embodiment of FIG. 4, a reservoir 310 is connected to tubing 314 utilizing a connector. A clamp 316 may clamp the tubing to a flange of the platform 108. Similarly, reservoir 322 is connected to tubing 324 utilizing a connector which may be clamped with clamp 326 to a flange of platform 108.

The fluid utilized in the embodiments herein could be any fluid suitable for transfer between two reservoirs. For example, in some cases water could be used. However, if the temperature of the instrumentation platform could fall below freezing then a different liquid could be used, such as glycol, among others. For embodiments in which the reservoir offsets or diameters must be small, a dense fluid such as mercury could be used to compensate.

In operation, fluid transfers between the reservoirs as the platform pendulates. The torque provided by the imbalance in the reservoirs lags the gravitational torque applied to the platform mass itself, and exerts a drag on the cone rotation. The internal mass motion can be made to be either continuous and regular, thereby synchronizing with the swinging. This may be referred to as a "tuned" damping device. Alternatively, the internal mass motion can be instantiate it only when an extreme swing has to be countered, referred to as a "on demand" damping device. The fluid damping of FIGS. 2, 3 and 4 is the former.

In particular, as the platform swings to one side, gravity will force the liquid from one reservoir into the other reservoir.

Specifically, taking a single pair of reservoirs and the piping there between, two reservoirs are provided at a specific distance from each other and about the suspension point. The tubing connects the reservoirs and exerts a drag on any fluid motion between the reservoirs, either implicitly by fluid-tube wall friction, or additionally by means of flow restrictions.

If the suspended platform is at rest, and thus with its centre of mass hanging vertically from the suspension point, the two reservoirs will be filled to the same level. The fluid mass on each side of the suspension point will be equal, and no net torque will be exerted on the platform by gravity acting on the fluid.

If the platform is swinging, the fluid in the reservoirs will continually attempt to reach gravitational equilibrium by flowing back and forth between the reservoirs. The center of gravity of the fluid will shift cyclically back and forth between the two sides of the suspension point. The net torque exerted on the fluid by gravity will therefore also cycle back and forth.

Despite any fluid restrictions imposed by the tubing, the fluid will continue to attempt to run downhill, whenever the platform swings. As the platform runs to one side, the fluid will already be running back towards the center, thus moving in the opposite rotational sense as the platform and providing a torque of the opposite sense to the torque acting on the platform alone.

In some cases, various constraints may be utilized in the design of the fluid damping system.

A first constraint may be that a certain ratio of the physical properties of the damping device cannot exceed a critical value, or the entire system will become unstable, tipping to one side and staying there. The system may be designed therefore to adhere to a suitably derived stability criterion, which, for two orthogonal pairs of reservoirs, is the following equation:

$$\frac{2\rho AD^2}{MH} < 1 \quad (1)$$

In equation 1 above, ρ is the density of the working fluid. A is the fluid surface area in each reservoir. D is the horizontal offset of each reservoir from the suspension point. M is the mass of the suspended platform, including the damping device. H is the distance between the suspension point and the center of mass. If the reservoirs are not identical, or not offset equally, or there are multiple pipes and reservoirs, more complex formula apply, but may be derived based on the above, using the principles of classical physics.

A second constraint is that if the ratio of the equation 1 is very much less than one, relatively little damping is achieved, and therefore this ratio should be as close to, but still less than, one in order to achieve significant damping.

A third constraint is that for maximum damping, the flow rate between the reservoirs should be restricted either naturally by the pipe alone, or with the aid of optional restriction valves, to give a characteristic re-equilibration time of fluid in the reservoirs to be somewhat less than the pendulum period of the suspended platform. In some embodiments, a fraction of about ⅙ may be optimal.

A fourth constraint is that the fluid viscosity and density, and the pipe and reservoir diameters, should ideally be such that in normal operation, the fluid flow is laminar everywhere, and not turbulent. Turbulence in the flow may introduce unacceptable levels of vibration in the device, which the suspended platform will share. A calculation of the Reynolds number for the fluid flow in the device will provide the required numerical guidance for this.

Specifically, due to the sensitivity of instrumentation on the platform, vibrations of any kind should be avoided. In this regard, the system is designed such that the fluid remains in the reservoirs even at the maximum tilt angle, thereby avoiding air in the tubing, which may cause vibrations and further restrict the flow of the fluid.

Further, in various embodiments of the present disclosure, turbulence is avoided, as such turbulence may impart unwanted high frequency accelerations into the system. The turbulence can manifest itself in two ways; first from non-laminar flow in the tubing, connectors and valves and second in the "sloshing" of the surface of the fluid in the reservoir at the fluid-air interface.

To avoid non-laminar flow in the tubing, various embodiments use only tubing and connectors but no orifices or restrictors. Specifically, the tubing is uniformly dimensioned and the connectors are designed to avoid turbulence in the fluid while in operation.

In order to avoid "sloshing" of the surface of the fluid in the reservoir, a baffle system inside the reservoir may be provided to compartmentalize the fluid in the reservoir. Specifically, reference is now made to FIG. 5.

Figure 5:
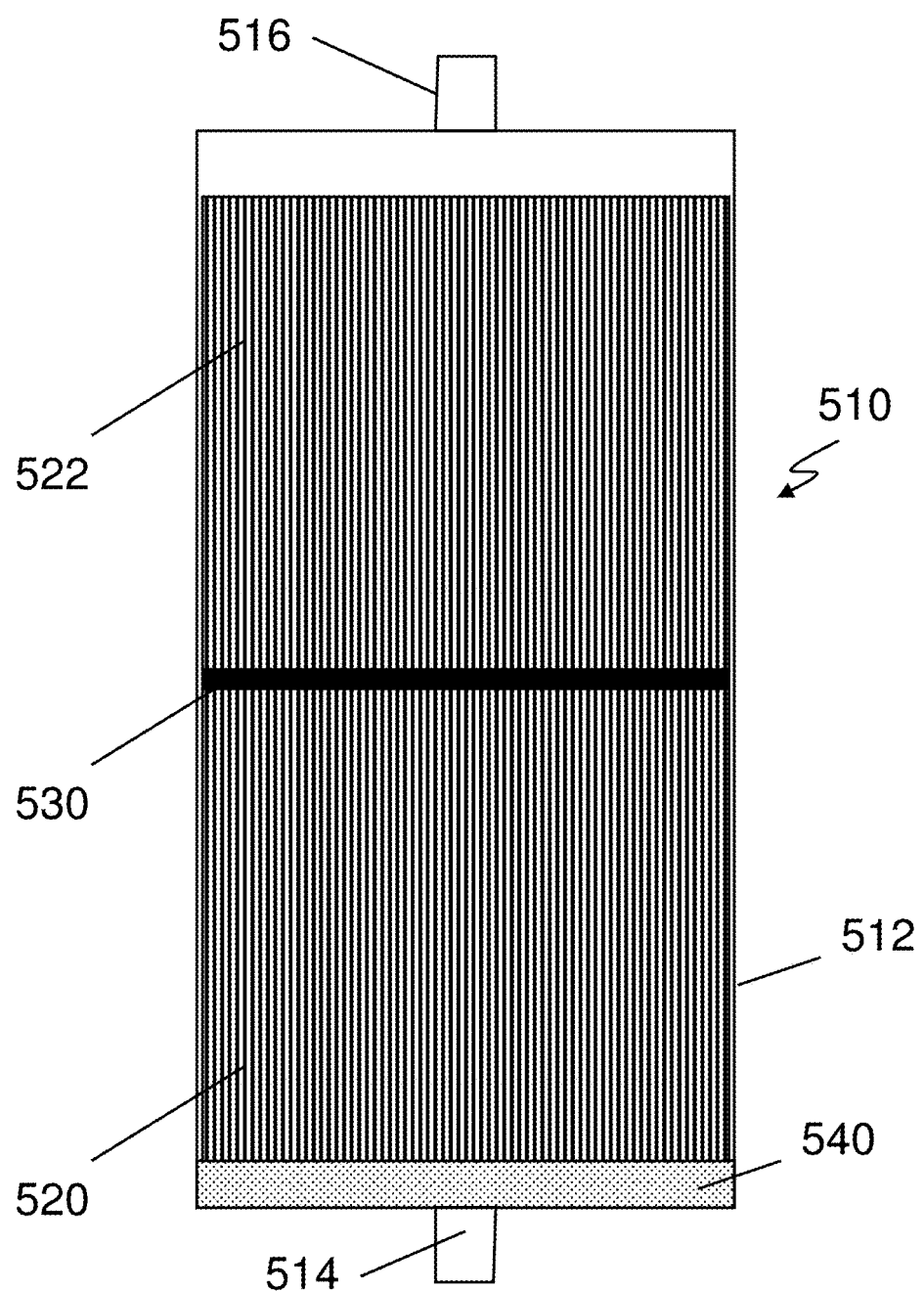
FIG. 5 is a side elevational view of an example reservoir according to one aspect of the present disclosure.

In the embodiment of FIG. 5 reservoir 510 includes the reservoir housing 512. Further, a fluid port 514 allows the ingress and egress of fluid from the reservoir into the tubing. An air port 516 allows the ingress and egress of air into the reservoir housing 512 to balance the ingress or egress of fluid.

At least one baffle system 520 containing a plurality of hollow shafts running the longitudinal length of the reservoir housing 512 is provided. These hollow shafts are dimensioned to allow fluid to flow freely therein, thereby avoiding surface tension. However, the hollow shafts are further dimensioned to limit turbulence ("sloshing") of the liquid.

In one embodiment, a single baffle system is provided within the housing 512. However, in other embodiments multiple baffle systems may be stacked on top of each other. Specifically, in the embodiment of FIG. 5, two baffle systems, namely baffle system 520 and baffle system 522, are provided.

A spacer unit 530 may be provided between the baffle system 520 and baffle system of 522. In some embodiments, spacer unit 530 may allow the flow of fluid in every hollow shaft from baffle system 520 to flow into every hollow shaft of baffle system 522.

However, as indicated above, tuning of the damping system may be accomplished in two ways. A first is to change the diameter of the tubing and a second is to change the diameter of the reservoir.

Therefore, in order to provide easy tuning of the damping system, a plurality of spacers 530 may be provided within the reservoir housing 512. The spacers may restrict the hollow shafts into which fluid may flow, thereby preventing some of the hollow shafts from filling with fluid and effectively restricting the diameter of the reservoir. As will be appreciated by those in the art, the spacer units 530 may be provided on a lower edge of the baffle 520 to prevent fluid from flowing into certain hollow shafts of baffle 520.

In some cases, the restriction may restrict outer hollow shafts from filling with fluid, leaving those closest to the centre capable of having fluid flow into and out of the hollow shafts.

In some cases, fluid flow is restricted so that the natural fluid re-equilibration time constant for the reservoirs, in response to a platform tilt, is less than but the same order of magnitude as a pendular oscillation frequency of the platform.

In some cases, rather than restricting flow based on a diameter, various patterns of hollow shafts may be blocked.

In this way, the damping system may be tuned based on parameters such as the mass of the platform 108, the diameter of the platform, the location of the reservoirs among other factors. Tuning may be based on equation 1 above in some cases.

Figure 6:
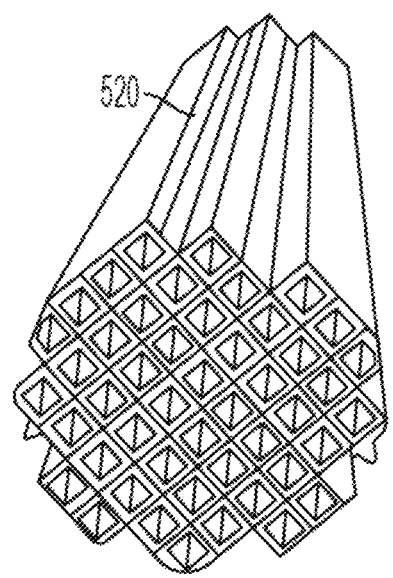
FIG. 6 is a perspective view of a baffle apparatus capable of being used with the embodiments of the present disclosure.

In some embodiments, the baffle system may be three dimensionally printed. For example, referring to FIG. 6, a baffle system 520 having a plurality of hollow shafts can be seen.

Referring to FIG. 5, a mesh layer 540, or other similar structure, may allow the fluid to flow through the fluid port 514 into the hollow shafts of the baffle system 520 in some cases.

Based on the above, a damping system with no moving mechanical parts is provided, making the construction and maintenance of such system easy and failure less likely. Further, no electrical components are provided, making such damping systems suitable for applications which require an electrically and magnetically quiet environment.

Further, the damping system can be built entirely without any metal parts. This makes such damping systems suitable for applications sensitive to magnetization or eddy currents. For example, metal parts may be kept away from instruments intended to measure ambient electrical or magnetic fields.

What has been described is merely illustrative of the application of the principles of the disclosure. Other arrangements and methods can be implemented by those skilled in the art without departing from the scope of the present disclosure.

The invention claimed is:

1. An apparatus for rotation rate damping of a suspended platform, the apparatus comprising:
a plurality of vertically-extended partially-filled fluid reservoirs, each of the reservoirs being open at a top and offset from a center of gravity of the suspended platform, the reservoirs being connected by tubing permitting fluid to flow between reservoirs in response to gravitational accelerations;
wherein motion of the fluid in the tubing creates damping of the rotational motion of the platform;
wherein the plurality of reservoirs consists of pairs of reservoirs, each diametrically offset horizontally from the center of gravity at a position diametrically opposed to an other reservoir in the pair; and
where the reservoirs in a pair are connected to each other by tubing, but not to reservoirs of any other pair.

2. The apparatus of claim 1 where two pairs of reservoirs are arranged with offsets from the center of gravity which are at right angles to each other.

3. The apparatus of claim 1, wherein the tubing extends in two half rings about opposite sides of the platform between the pair of reservoirs.

4. The apparatus of claim 3, wherein the tubing is connected to each reservoir of the pair of reservoirs using a T-junction.

5. The apparatus of claim 4, wherein the T-junctions and the tubing have uniform dimensions.

6. The apparatus of claim 1, wherein each reservoir contains hollow shafts therein to prevent sloshing of the fluid.

7. The apparatus of claim 6, wherein each reservoir contains at least two bundles of hollow shafts, the apparatus further comprising a separator between the bundles of hollow shafts allowing fluid to flow from hollow shaft to hollow shaft.

8. The apparatus of claim 6, wherein a separator is configured to block a subset of hollow shafts, thereby allowing tuning of the motion damping.

9. The apparatus of claim 6, further comprising a fluid permeable layer under a bundle of hollow shafts to allow fluid to flow into the tubes.

10. The apparatus of claim 1, wherein the tubing connects all pairs of reservoirs with a single tube.

11. The apparatus of claim 1, wherein the platform contains instrumentation for Audio Frequency Magnetic (AFMAG) exploration.

12. The apparatus of claim 1, wherein the platform contains instrumentation for Controlled-Source Airborne ElectroMagnetic (AEM) exploration.

13. The apparatus of claim 1, wherein each reservoir includes a port at an upper surface thereof for air ingress into the reservoir or egress from the reservoir.

14. The apparatus of claim 13, wherein each reservoir contains a baffle apparatus, the baffle apparatus comprising a plurality of hollow shafts therein, wherein the apparatus is tuned by blocking a subset of the hollow shafts.

15. The apparatus of claim 1, wherein the platform rests on a single pivot point.

16. The apparatus of claim 1, wherein the apparatus is designed to adhere to:

$$\frac{2\rho AD^2}{MH} < 1$$

where ρ is a density of a working fluid; A is a fluid surface area in each reservoir; D is a horizontal offset of each reservoir from a suspension point; M is a mass of the platform, including the apparatus; and H is a distance between the suspension point and a center of mass.

17. The apparatus of claim 1, wherein a density of the fluid, a flow rate of the fluid, a length of the tubing, and a viscosity of the fluid have values such that fluid flow through the tubing has a Reynolds number corresponding to a laminar flow.

18. The apparatus of claim 1, further comprising restriction valves to restrict fluid flow such that a natural fluid re-equilibration time constant for the reservoirs, in response to a platform tilt, is less than but a same order of magnitude as a pendular oscillation frequency of the platform.

* * * * *